(12) United States Patent
Earl et al.

(10) Patent No.: US 6,530,576 B1
(45) Date of Patent: Mar. 11, 2003

(54) PROTECTIVE CLOSURE

(76) Inventors: Larry James Earl, 1180 N. 350 W., Shelbyville, IN (US) 46176; Bryan Scott Earl, 1626 N. 325 W., Shelbyville, IN (US) 46176

(*) Notice: Subject to any disclaimer, the term of this patent is extended or adjusted under 35 U.S.C. 154(b) by 0 days.

(21) Appl. No.: 09/923,131

(22) Filed: Aug. 6, 2001

(51) Int. Cl.$^7$ ............................................. F16K 35/00
(52) U.S. Cl. ....................... 277/615; 277/602; 137/381; 137/382
(58) Field of Search ............................... 137/381, 382; 277/602, 615

(56) References Cited

U.S. PATENT DOCUMENTS

| | | | |
|---|---|---|---|
| 1,156,469 A | | 10/1915 | Dodge |
| 1,894,867 A | | 1/1933 | Hoffman |
| 1,898,378 A | | 2/1933 | McIntyre |
| 2,166,921 A | | 7/1939 | White |
| 2,217,581 A | | 10/1940 | White |
| 2,327,628 A | | 8/1943 | Ewing |
| 2,371,231 A | | 3/1945 | Duff |
| 2,418,253 A | | 4/1947 | Ewing |
| 3,114,561 A | * | 12/1963 | Creath et al. ................ 277/152 |
| 3,514,129 A | * | 5/1970 | Holdren ....................... 285/162 |
| 3,625,525 A | * | 12/1971 | Davis, Jr. .................... 277/118 |
| 3,963,144 A | | 6/1976 | Berwald |
| 4,301,828 A | | 11/1981 | Martin, Jr. |
| 4,462,620 A | * | 7/1984 | Bambenek et al. ...... 285/140.1 |
| 4,478,345 A | | 10/1984 | Edinger |
| 4,511,055 A | | 4/1985 | Carlson |
| 4,600,033 A | | 7/1986 | Baron |
| 4,967,923 A | | 11/1990 | Wren |
| 4,993,450 A | | 2/1991 | Dunn |
| 5,086,804 A | * | 2/1992 | Ngai ........................... 137/312 |
| 5,119,844 A | | 6/1992 | Cannon et al. |
| 5,135,324 A | * | 8/1992 | Bravo .......................... 405/52 |
| 5,238,141 A | | 8/1993 | Callegari et al. |
| 5,529,089 A | | 6/1996 | Hicks et al. |
| 5,638,858 A | | 6/1997 | Gettinger et al. |
| 6,082,395 A | * | 7/2000 | Balint ......................... 137/382 |

\* cited by examiner

*Primary Examiner*—A. Michael Chambers
(74) *Attorney, Agent, or Firm*—Barnes & Thornburg

(57) ABSTRACT

A method of, and apparatus for, closing an opening defined at least in part by a wall which at least partially surrounds the opening. The wall has a first thickness. According to one embodiment, a strip of material includes a groove which opens in a first direction and resilient projections which extend in a second, generally opposite direction from the first direction. The method according to this embodiment includes receiving the edge of the surrounding wall in the groove. The projections project at least partway across the opening substantially to obstruct access to it. In another embodiment, a method of closing an opening defined at least in part by a wall of a cover for a valve of a fuel tank includes providing a device having a perimetrally outwardly opening groove. The device further includes resilient projections which extend generally in an opposite direction to the direction in which an adjacent region of the groove opens. The groove receives the edge of the surrounding wall. The projections project at least partway across the opening substantially to obstruct access to it.

12 Claims, 2 Drawing Sheets

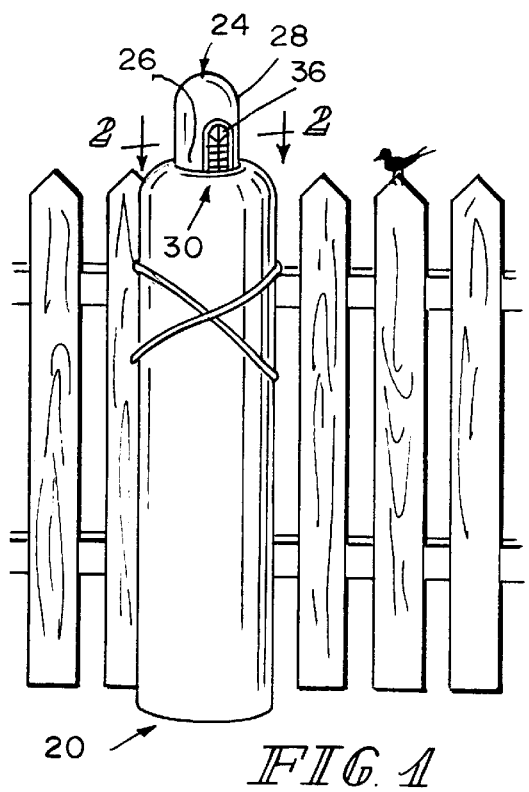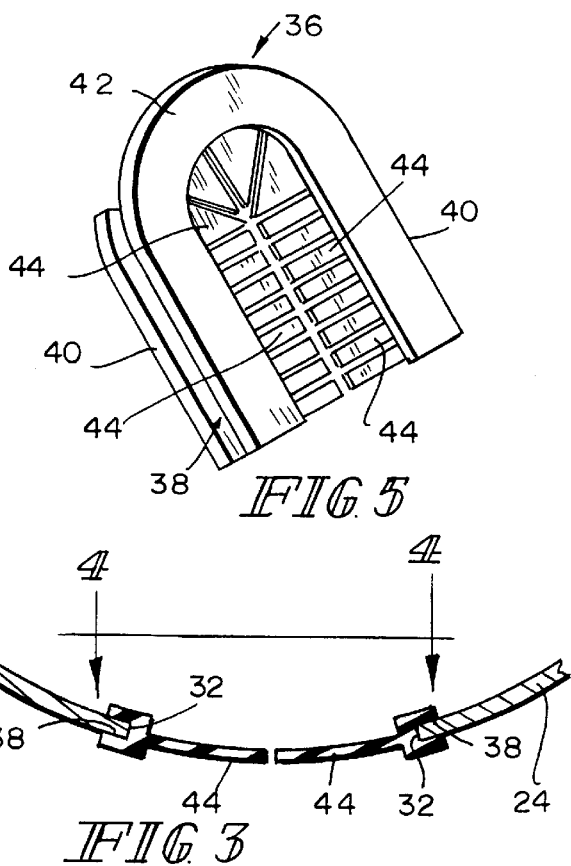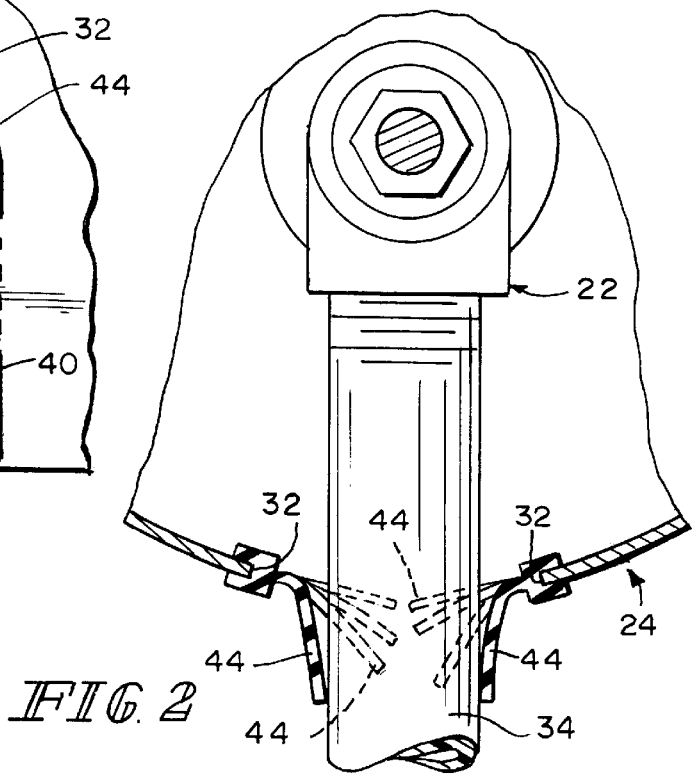

PROTECTIVE CLOSURE

FIELD OF THE INVENTION

This invention relates to device for discouraging access to covered spaces by, for example, animals.

BACKGROUND OF THE INVENTION

Liquefied petroleum (LP) gas tanks, propane tanks and the like are commonly used, for example, in geographic areas where natural gas service is not otherwise available. Distributors monitor the levels of gas in the tanks and replace them with full tanks as necessary. The valves and regulators are removed from the tanks, new tanks placed in service by placing the valve and regulator on the new tank, the valve is opened, restoring service to the user, and the spent tank is removed, usually to be returned to the distributor to be refilled. Because the tanks are often located outside of residences, businesses and the like, the tanks are typically equipped with covers for the valve and regulator components to protect these components from the elements. The covers include provisions for the exit of the supply line from the valve and regulator to the house or business being served. A problem with this is that animals, typically birds, can get into the space defined under the covers through the openings through which the supply lines pass. The birds nest under the covers, fouling the area around the valve and regulator, and sometimes making these components difficult to service when the tank is being replaced by distributor personnel.

DISCLOSURE OF THE INVENTION

According to one aspect of the invention, a strip of material includes a groove which opens in a first direction, and resilient projections which extend in a second, generally opposite direction from the first direction.

Illustratively according to this aspect of the invention, the strip further includes a stiffening member embedded in the strip.

Further illustratively according to this aspect of the invention, the strip of material is a strip of material which is capable of being cut to a desired length.

Additionally illustratively according to this aspect of the invention, the resilient projections are resilient projections which are capable of being cut to desired length.

According to another aspect of the invention, a method is provided for closing an opening defined at least in part by a wall which at least partially surrounds the opening. The wall has a first thickness. The method includes providing a strip of material defining a groove which opens in a first direction and resilient projections which extend in a second, generally opposite direction from the first direction, and receiving the edge of the surrounding wall in the groove. The projections project at least partway across the opening substantially to obstruct access to it.

Illustratively according to this aspect of the invention, providing a strip having a groove includes providing a strip having a groove with a width slightly less than, to substantially equal to, the first thickness to promote retention of the surrounding wall in the groove, and thus, the strip on the surrounding wall.

Further illustratively according to this aspect of the invention, providing a strip of material including resilient projections includes providing a strip of material including resilient projections capable of being cut to desired lengths.

The method further includes cutting the projections to desired lengths.

Additionally illustratively according to this aspect of the invention, providing a strip of material includes providing a strip of material capable of being cut to a desired length. The method further includes cutting the strip to a desired length.

Illustratively according to this aspect of the invention, the method further includes cutting notches in the bead to enhance the flexibility of the strip.

According to another aspect of the invention, a method is provided for closing an opening defined at least in part by a wall which at least partially surrounds the opening. The wall has a first thickness. The method includes providing a device including around its outer perimeter a perimetrally outwardly opening groove, and resilient projections which extend generally in an opposite direction to the direction in which an adjacent region of the groove opens. The method further includes removing a portion of the device along a generally straight line, and receiving a portion of the edge of the surrounding wall in the groove. The projections project at least partway across the opening substantially to obstruct access to it.

Illustratively according to this aspect of the invention, providing a device having a groove includes providing a device having a groove with a width slightly less than, to substantially equal to, the first thickness.

According to another aspect of the invention, a method is provided for closing an opening defined at least in part by a wall of a cover for a valve of a fuel tank. The wall has a first thickness. The method includes providing a device defining around its outer perimeter a perimetrally outwardly opening groove, and resilient projections which extend generally in an opposite direction to the direction in which the groove opens. The method further includes receiving the edge of the surrounding wall in the groove. The projections project at least partway across the opening substantially to obstruct access to it.

Illustratively according to this aspect of the invention, providing a device having a groove includes providing a device having a groove with a width slightly less than, to substantially equal to, the first thickness.

According to another aspect of the invention, a device defines part of the way around its outer perimeter a perimetrally outwardly opening groove. The device further includes inside its outer perimeter a central region. The central region includes resilient projections which extend generally in an opposite direction to the direction in which an adjacent portion of the groove opens. The device includes a generally straight sidewall portion having no groove. The projections project at least partway across the central region substantially to obstruct it.

BRIEF DESCRIPTION OF THE DRAWINGS

The invention may best be understood by referring to the following detailed description and accompanying drawings which illustrate the invention. In the drawings:

FIG. 1 illustrates an elevational view of a tank of the general type to which the invention relates, with a device according to one aspect of the invention fitted to the cover of the tank;

FIG. 2 illustrates a fragmentary sectional view of a detail of the tank illustrated in FIG. 1, taken generally along section lines 2—2 of FIG. 1;

FIG. 3 illustrates the detail illustrated in FIG. 2 with the service line removed;

FIG. 4 illustrates a sectional view of the detail illustrated in FIG. 3, taken generally along section lines 4—4 of FIG. 3;

FIG. 5 illustrates a perspective view of a device according to one aspect of the invention;

DETAILED DESCRIPTIONS OF ILLUSTRATIVE EMBODIMENTS

Figure 6:
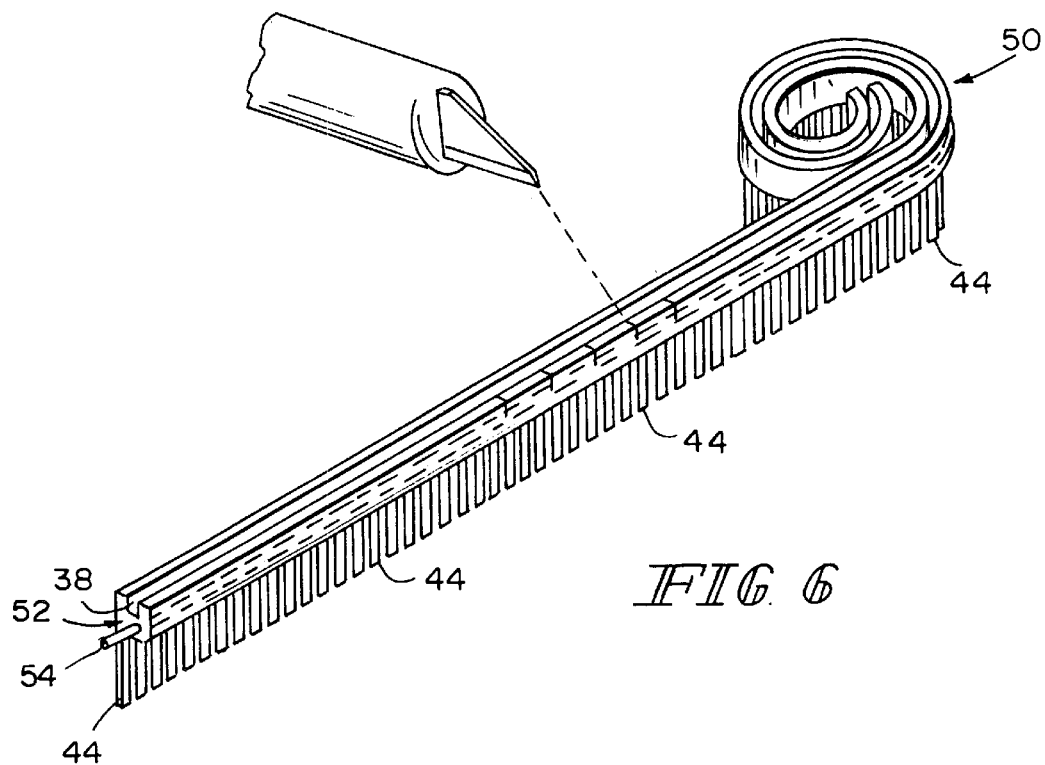
FIG. 6 illustrates a perspective view of material constructed according to another embodiment of the invention.

Referring now particularly to FIGS. 1–5, a gas tank 20 of a generally right circular cylindrical configuration is surmounted to a removable valve and regulator 22, best illustrated in FIG. 2. The removable valve and regulator 22 is covered by a protective cover 24 which includes a generally somewhat right circular cylindrical skirt 26 closed by a domed top 28. Skirt 26 defines a generally somewhat inverted U-shaped relief or notch 30. When cover 24 is mounted on tank 20, the tank 20 and notch 30 cooperate to define an opening 32 through which a gas service line 34 passes from the valve and regulator 22 to the facility being supplied with gas from tank 20. If the opening 32 remains otherwise uncovered, it invites entry by animals, for example, birds, which may nest in the space between cover 24 and the top of tank 20. This may result in fouling of the valve and regulator 22, and soiling of the top of tank 20, rendering it difficult and/or unpleasant for distributor personnel to service the tank 20 or the valve and regulator 22.

According to one aspect of the invention, a generally oval-shaped grommet 36 is inserted into the notch 30 before cover 24 is replaced on tank 20 after tank 20 is serviced. Grommet 36 illustratively is constructed from a flexible, resilient, elastomeric material, such as a synthetic rubber. Grommet 36 includes a groove 38 which extends at least part of the way around its perimeter, illustratively, along its generally straight parallel sides 40. In some cases, the groove 38 may extend all of the way around the perimeter of grommet 36, including its part circular ends 42. The groove 38 is of sufficient width and depth to receive the region of the cover 24 adjacent the edge 32 of notch 30. Since the bottom of the opening 32 is generally an arc of a circumference of tank 20, one of the part circular ends 42 of the generally oval-shaped grommet 36 desirably is cut off, for example, with a pair of shears, prior to installation of grommet 36 in notch 30. This way, grommet 36 fits closely against the tank 20 in the region of the bottom of opening 32. The grommet 36 includes resilient projections, such as flaps, 44, which are closely enough spaced to each other to discourage animals from flexing the flaps 44 to gain entry to the space between the tank 20 and cover 24. At the same time, the flaps 44 permit the passage of the service line 34 from the valve and regulator 22 out of the space to the facility being serviced.

Figures 7, 8:
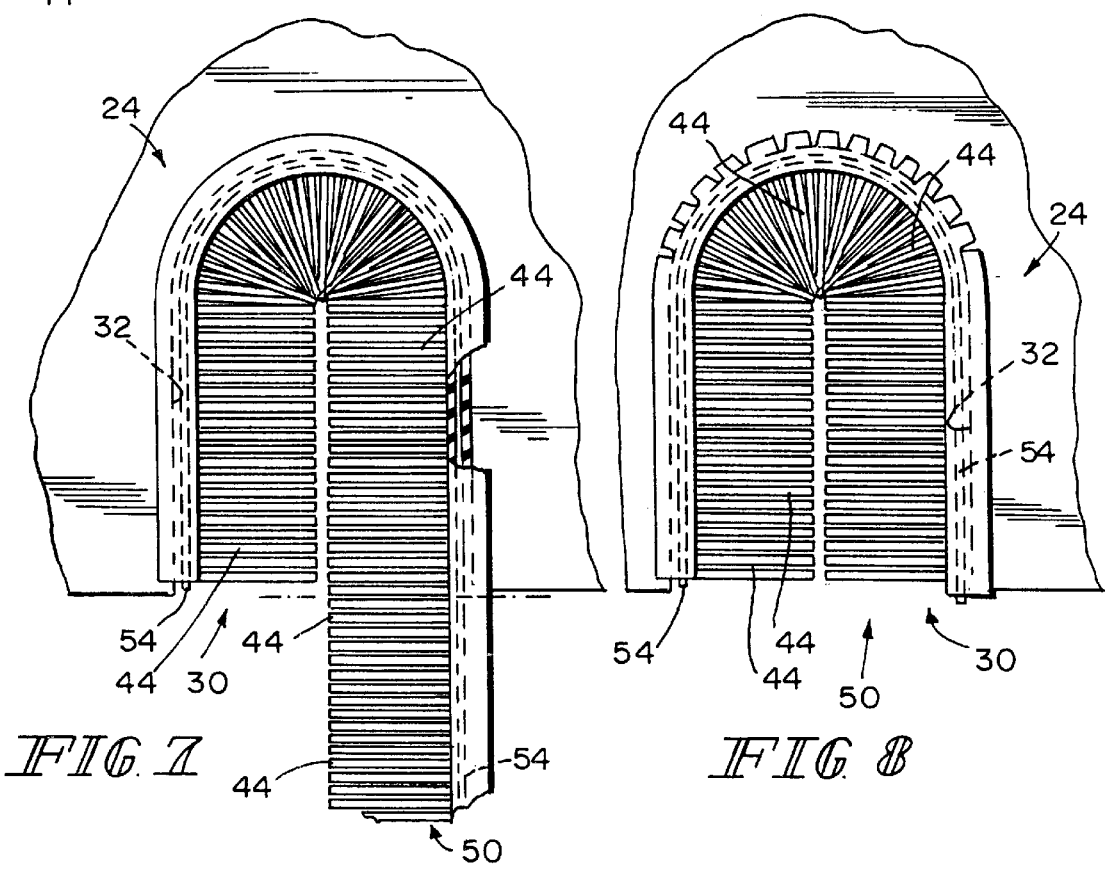
FIG. 7 illustrates a step in the application of the material illustrated in FIG. 6 to a protective cover for a valve and regulator assembly for a gas tank; and, FIG. 8 illustrates another material constructed according to the invention applied to a protective cover for a valve and regulator assembly for a gas tank.

According to another embodiment of the invention illustrated in FIGS. 6–8, a strip 50 of an elastomeric material includes a somewhat U-shaped bead 52 from which resilient flaps 44 having lengths at least equal to about half the distance across the widest notch 30 the material is designed to close. The U-shaped bead 52 defines a groove 38 which is dimensioned to removably secure the strip 50 to edge 32 by engaging the sidewall of cover 24 around edge 32. Strip 50 may include an embedded wire 54 or the like to provide additional stiffness to the elastomeric material to aid in retaining it in place once it is formed into the shape of the notch 30 and put in place. If the strip 50 is longer than necessary to close an opening 32, it may be cut to a desired length, as illustrated by the broken line in FIG. 7. If the radius of curvature of a portion of opening 32 is smaller than can readily be accommodated by strip 50, strip 50 can be cut partway through, as illustrated by comparing FIGS. 6 and 8, to accommodate the smaller radius of curvature. Additionally, the strip 50 can be made of a material which permits flaps 44 to be cut to any desired length to accommodate any desired width of notch 30.

What is claimed is:

1. A device for at least partially closing an opening, the opening having an edge having a first thickness, the device having a perimetral portion extending at least part of the way around an outer perimeter of the device, but less than all of the way around the perimeter, the perimetral portion providing a perimetrally outwardly opening groove, the groove having a first width measured perpendicular to a direction around the perimetral portion, the first width being substantially equal to the first thickness to receive the edge and retain the device in the opening, and a web region extending inwardly from the perimetral portion in a direction opposite the direction in which the groove opens, the web region being slitted to permit flexing of adjacent regions of the web region to facilitate the passage of a conduit through the web region.

2. The device of claim 1 constructed from an elastomeric material.

3. A device for at least partially closing an opening, the opening having an edge having a first thickness, the device having a first portion extending along a first edge of the device, the first portion providing a groove, the groove having a first width measured perpendicular to a direction along the first edge, the first width being substantially equal to the first thickness to receive the edge of the opening and retain the device in the opening, and a web region extending away from the first portion in a direction substantially opposite the direction in which the first groove opens, the web region being slitted to facilitate flexing of the device to facilitate insertion of the edge of the opening into the groove and installation of the device into the opening, and to facilitate passage of a conduit through the opening covered by the web region.

4. The device of claim 3 constructed from an elastomeric material.

5. The device of claim 4 further including a stiffening member embedded in the first portion and extending therealong, the stiffening member being deformable to substantially the outline of the opening to facilitate installation of the device into the opening and retention of the device in the opening.

6. The device of claim 4 capable of being cut to a desired length to facilitate mounting the device in an opening having a particular perimeter.

7. The device of claim 4 wherein the slitted web is capable of being cut to one or more desired lengths to facilitate flexing of the device to facilitate insertion of the edge of the opening into the groove and installation of the device into the opening, and to facilitate passage of a conduit through the opening covered by the web region.

8. The device of claim 3 further including a stiffening member embedded in the first portion and extending therealong, the stiffening member being deformable to substantially the outline of the opening to facilitate installation of the device into the opening and retention of the device in the opening.

9. The device of claim 8 capable of being cut to a desired length to facilitate mounting the device in an opening having a particular perimeter.

10. The device of claim 8 wherein the slitted web is capable of being cut to one or more desired lengths to facilitate flexing of the device to facilitate insertion of the edge of the opening into the groove and installation of the device into the opening, and to facilitate passage of a conduit through the opening covered by the web region.

11. The device of claim 3 capable of being cut to a desired length to facilitate mounting the device in an opening having a particular perimeter.

12. The device of claim 11 wherein the slitted web is capable of being cut to one or more desired lengths to facilitate flexing of the device to facilitate insertion of the edge of the opening into the groove and installation of the device into the opening, and to facilitate passage of a conduit through the opening covered by the web region.

* * * * *